Feb. 7, 1933.  H. HUEBER ET AL  1,896,792
PACKING FOR WINDSHIELD CLEANERS
Filed July 2, 1930
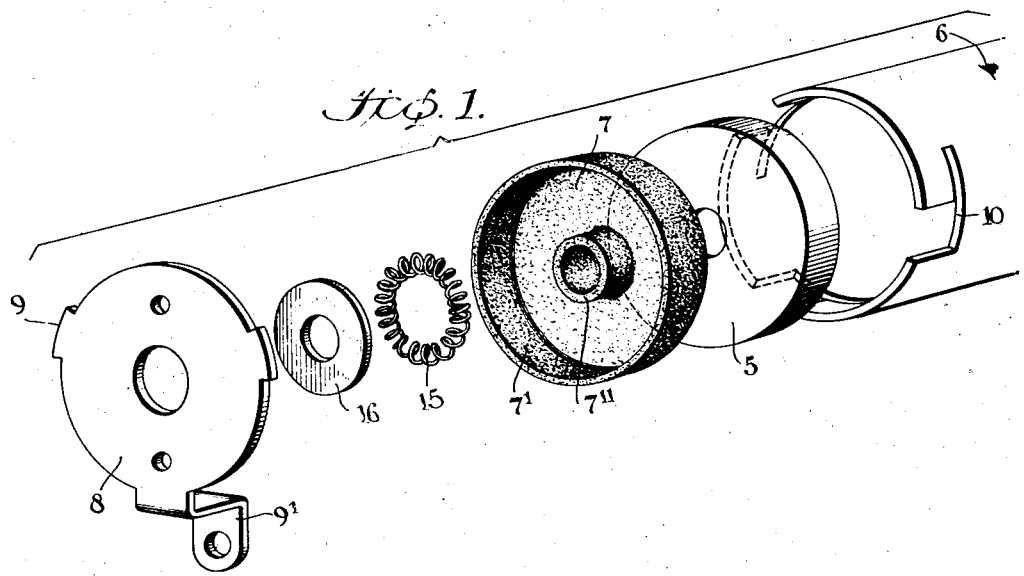
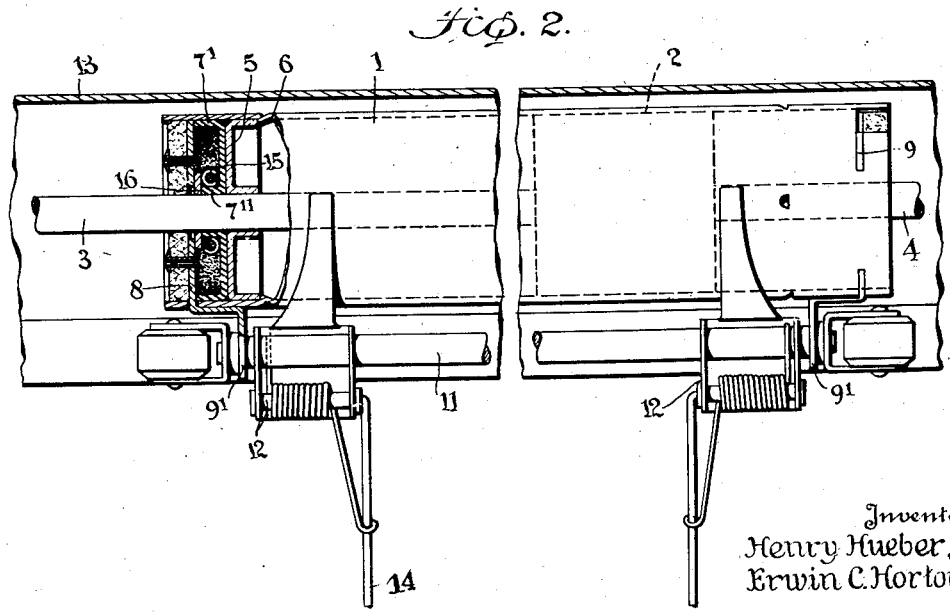
Inventors
Henry Hueber,
Erwin C. Horton,
By Barton A. Bean Jr.
Attorney Patented Feb. 7, 1933

1,896,792

UNITED STATES PATENT OFFICE

HENRY HUEBER, OF BUFFALO, AND ERWIN C. HORTON, OF HAMBURG, NEW YORK, ASSIGNORS TO TRICO PRODUCTS CORPORATION, OF BUFFALO, NEW YORK

PACKING FOR WINDSHIELD CLEANERS

Application filed July 2, 1930. Serial No. 465,417.

This invention relates to an automatic windshield cleaner of the suction operated or fluid pressure type and has particular reference to the moving cylinder type such as that disclosed in the co-pending application of Henry Hueber and John R. Oishei, filed October 24, 1925, Serial No. 62,437, now Patent No. 1,817,563, issued Aug. 4, 1931, on which this invention is an improvement.

In this type of windshield cleaner there is a piston with intake and outlet fluid pressure pipes extending oppositely therefrom and slidably through the ends of a cylinder that has relative movement with respect to the piston. This construction utilizes a novel end packing for the cylinder so as to pack the sliding contact between the cylinder and the pipes against fluid leakage. This end packing embodies a packing flange carried by the cylinder and having sliding contact with the respective pipe and is therefore subject to wear so that after a period of use leakage along the pipe will result with an impairment in the efficiency of the cleaner.

The present invention aims to render the packing more efficient and to prolong the life thereof, and it resides in the features and the arrangements and combinations of parts hereinafter referred to and claimed, reference being had to the accompanying drawing, wherein:

Fig. 1 is a disassembled perspective view of the end packing of the windshield cleaner cylinder, and Fig. 2 is a fragmentary showing of the windshield cleaner, depicting the end packing in its assembled formation.

Referring more in detail to the accompanying drawing, the numeral 1 designates a windshield cleaner cylinder enclosing the piston 2 to which the pipes 3 and 4 are connected and extended through the ends of the cylinder, as is more fully set forth in the above referred to co-pending application. In the preferred arrangement the cylinder 1 constitutes the movable element of the windshield cleaner motor, it being slidably supported on the tubes 3 and 4 so as to reciprocate on the fixed piston 2.

In each end of the cylinder is provided a supporting plate or head 5, retained against inward displacement by limit shoulders 6 and designed for supporting a cupped leather or other packing member 7 which is retained in position by a locking plate 8 having radial lugs 9 for engaging in the bayonet slots 10 of the cylinder. By engaging these lugs 9 in their slots 10 and giving the plate 8 a slight rotary movement said plate is interlocked with the cylinder against outward displacement so as to hold the packing member 7 confined between the locking plate and the supporting head 5. One of the lugs of each locking plate is extended as at 9' to provide a support for a wiper supporting bar 11 on which the wiper carriages 12 are mounted as set forth in said co-pending application, the entire assembly being housed within the casing 13 open at its lower side so as to provide for the operative connection between the wiper carrying arms 14 and the windshield cleaner motor.

The packing member 7 has a peripheral flange 7' fitting against the inner wall of the cylinder 1 to seal against fluid leakage at that point. Where the fluid pipe (3, 4) pierces the packing member 7 the latter is provided with a second flange 7" designed to hug or embrace the respective fluid pipe in sliding contact therewith and thereby seal this sliding joint against fluid leakage when the adjacent end of the cylinder is connected to a source of suction through the piston 2. Because of the wear on this inner packing flange 7" the embrace of the latter on its fluid pipe will become less secure. Continuous sliding back and forth of the cylinder will cause the fluid pipe to ream out or enlarge the inner diameter of the flange 7", so that this wearing will provide leakage along the fluid pipe and render the cleaner motor more or less inefficient.

To overcome this and to improve upon the packing and lengthen its life of usefulness, there is provided means for insuring a close fitting of the inner flange with its fluid pipe throughout the life of the flange. Such a means is shown at 15 and comprises in the preferred embodiment an annulus formed from a coiled spring whereby the annulus or ring is readily flexible and resilient and will serve to exert a light contracting pressure on the packing flange 7''. Interposed between the locking plate 8 and the resilient ring 15 is a pusher or retainer plate 16 which has a sliding fit with the adjacent fluid pipe and is arranged thereon so as to push the resilient ring along the pipe and up over the packing flange 7'' when the locking plate is operatively positioned. This holds the ring in its operative position, confining the same between the bottom of the cup and the plate 16. During this step in the assembly of the end packing the resilient ring will expand under tension as it rides outwardly over the packing flange 7'' so as to provide a close embrace about the flange with a constant inward urge thereon.

Consequently, as the cylinder is reciprocated along the pipes 3 and 4, or vice versa, and wear gradually occurs on the inner periphery of the packing flange 7'', the resilient ring 15 will serve to compensate for this wear and take-up the same, thereby causing said packing flange to continuously hug the respective fluid pipe against leakage of atmosphere into the cylinder. This will insure an efficient packing between the pipe and the cupped packing which will continue to function for the life of the packing flange 7''. The plate 16, being preferably held in abutting relation with the free end of the packing flange 7'', tends to steady and brace the same against any shifting as the cylinder slides upon the fluid pipes.

What is claimed is:

1. A packing for sliding shafts comprising a hollow member having an interior shoulder, a rigid supporting plate arranged within the hollow member and seating on the shoulder, said plate having an axially disposed portion forming a bearing for a slidable shaft, a cupped washer seating on the supporting plate and having a peripheral flange extending away therefrom in packing embrace with the inner periphery of the hollow member, said cupped washer having an axially extending packing flange extending away from said supporting plate and from within the cupped washer in packing embrace with the sliding shaft, a resilient ring formed from a coiled spring and disposed within the cupped washer about the axially extending packing flange to urge the latter into packing embrace with the sliding shaft, a pusher plate seating on the end of the axially extending packing flange and extending outwardly over the resilient ring to hold the same against displacement from said axially extending packing flange, and means for securing the cupped washer within said hollow member.

2. A packing for sliding shafts comprising a hollow member having a rigid supporting part, a cupped washer seating on the supporting part, and having a peripheral flange extending in packing embrace with the inner periphery of the hollow member, an outside locking plate for the cupped washer, said peripheral flange being coextensive with the space between the inner rigid supporting part and the outside locking plate, said cupped washer having an axially extending packing flange extending away from the supporting part and from within the cupped washer in packing embrace with a shaft, a resilient ring formed from a coiled spring and disposed within the cupped washer about the axially extending packing flange to urge the latter into packing embrace with the shaft, and a pusher plate seating on the end of the axially extending packing flange and extending outwardly over the resilient ring to hold the same against displacement from said axially extending packing flange, said locking plate also retaining said pusher plate operative.

3. A packing for a sliding shaft comprising a hollow member, a rigid supporting plate arranged within the hollow member, a cupped washer seating on the supporting plate and having a peripheral flange extending away therefrom in packing embrace with the inner periphery of the hollow member, said cupped washer having an axially extending packing flange extending away from said supporting plate and from within the cupped washer in packing embrace with a sliding shaft, a resilient ring formed from a coiled spring and disposed within the cupped washer about the axially extending packing flange to urge the latter into packing embrace with the sliding shaft, a pusher plate seating on the end of the axially extending packing flange and extending outwardly over the resilient ring to hold the same against axial displacement from said axially extending packing flange, and a removable locking plate seating on the cupped washer and on said pusher plate to hold the same in position.

HENRY HUEBER.
ERWIN C. HORTON.